United States Patent [19]
Steinmann

[11] 3,893,534
[45] July 8, 1975

[54] SERVO AIDED STEERING SYSTEM
[75] Inventor: Helmut Steinmann, Baden-Baden, Germany
[73] Assignee: Robert Bosch G.m.b.H., Stuttgart, Germany
[22] Filed: Feb. 27, 1974
[21] Appl. No.: 446,167

[30] Foreign Application Priority Data
Mar. 10, 1973 Germany............................ 2312009

[52] U.S. Cl................. 180/79.1; 192/.02; 192/81 R
[51] Int. Cl............................................... B62d 5/04
[58] Field of Search ................ 180/79.1; 74/388 PS; 192/81 R, 81 C, .02

[56] References Cited
UNITED STATES PATENTS
2,930,247   3/1960   Zinn.................................... 180/79.1
3,570,639   3/1971   Fredell............................. 192/81 C

*Primary Examiner*—Leo Friaglia
*Assistant Examiner*—John A. Pekar
*Attorney, Agent, or Firm*—Flynn & Frishauf

[57] ABSTRACT

A torsion element such as a shaft portion of reduced diameter connects a driven steering shaft to a manually actuated steering drive shaft. A helical spring coupling connects a driving gear operated by a reversible electric motor in such a way that when the torque applied to the torsion element is at or near zero, or torque can be transmitted from the motor to the driven shaft, whereas the presence of torque causes the spring to be expanded, as a result of which the motor is coupled to the driven shaft with a frictional engagement that increases the transmission as the manually applied torque is increased. As soon as the manually applied torque falls below a threshold value, the coupling of the motor is released. The motor accordingly does not need to have its speed controlled and is operated by a simple directional control responsive to the deformation of the torsion element. The system is essentially fail-safe and accordingly suitable for steering vehicles.

7 Claims, 6 Drawing Figures

SERVO AIDED STEERING SYSTEM

This invention relates to a servo aided steering system, especially for motor vehicles, with a manually operated steering column as a driving shaft coupled to a driven steering shaft which is also coupled to a motor arranged to provide an aiding torque to the driven shaft over a coupling.

In one known form of servo aided steering the manually operated steering column is fixed so as to turn with the steering shaft that operates the steering mechanism and the combination carries a gear wheel engaging another gear arranged to be driven by an electric motor over a coupling. The coupling in this case is so constituted that it always engages whenever a gear wheel driven by the armature shaft of the motor is rotated, relative to the gear engaged with the steering column, by more than a certain angle. The motor is caused to operate in one or the other direction by a torque measuring means connected to the steering column. A disadvantage of the above-described arrangement is that the coupling to the motor also engages when the front wheels automatically move into their position for straight ahead travel, as the result of a restoring force when the vehicle is driven out of a curve, because in this case also a relative movement of the above-mentioned gear wheels is produced. This means that the free return of the wheel to which drivers have become accustomed is either made much more difficult, if the electric motor is not switched on, or else the electric motor must be switched on and contribute its force even when the wheels return to position.

A further disadvantage of this system is that upon a failure of the motor or of the cirucit connected to it, the motor armature must be turned along with the steering mechanism with every steering movement, since in this case also the motor coupling goes into engagement. In addition, the case can arise in which the motor continues operating because of a defect in the control system even though the manual actuation has already been completed and the necessary steering action has been executed. If this happens in the known servo system above described, the steering shaft is necessarily rotated further, because the coupling maintains a fixed rotary connection between the motor and the steering shaft under these conditions. This known system is therefore not suitable as a servo aided steering system for motor vehicles, because it operates with too little safety under a variety of operating conditions. It has therefore not been adopted in practice.

It is an object of the invention to provide a servo aided steering system, more particularly a system suitable for powering by an electric motor, that does not have the above-mentioned disadvantages. The servo steering system should in particular allow the usual free return of the wheels to their straight position in coming out of a curve and, moreover, be so constituted that in the case of a failure, for example by the failure of the servo motor to be turned off, the coupling of the motor will automatically be released.

SUBJECT MATTER OF THE PRESENT INVENTION

Briefly, the manually actuatable driving shaft of a steering system is coupled to a driven steering shaft by a torsion coupling that transmits the actuating torque while providing a small relative displacement between the driving and driven shafts dependent on the direction and amount of torque. The aiding motor is coupled to the driven shaft over a second coupling means so constituted as to release the motor from the driven shaft when the torque transmitted by the first coupling falls below a predetermined amount of torque.

The second coupling can be constituted with the aforesaid characteristics by the use of a helical spring in an annular space between a cup-shaped member on the driving shaft provided for manual actuation and the inner surface of a hub of a gear driven by the motor. The cup-shaped member has part of its circumferential wall cut out and the ends of the helical spring are bent inward, while its length is such that these inwardly protruding ends loosely grasp into the cut-out of the cup-shaped member. Likewise loosely protruding into the cut-out area, between the spring ends, is a finger mounted on a structure fixed to the driven portion of the steering shaft on the far side of the torsion coupling, so that the position of the finger in the cut-out will vary with the direction and amount of torque provided by manual actuation. In the quiescent state, when there is no applied torque, the helical spring rests on the inner circumferential wall of the bore of a hub of a gear connected to the motor, but the bias giving the spring this position is so slight that the frictional forces are not sufficient to do more than move the spring a little until the trailing hooked end catches on the cup-shaped member, causing the spring to contract and free the coupling. When the torsion shaft coupling is deformed by torque, however, one of the spring ends hits the aforesaid finger before the other reaches the edge of the cut-out of the cup-shaped member and the spring is thereby expanded, so that it presses against the inner wall of the hub bore and enables the motor to drive the driven shaft, but only until the torque drops back again below a certain value, when the spring again contracts and the coupling is released.

The torsion element provides a quasi-stiff connection of the manually actuatable drive shaft and the driven shaft, giving the advantage that in any case the manual steering torque can be transferred over this torsion element from the manual drive to the driven shaft. This torsion element, moreover, assures that the motor coupling is always in the proper condition. That is, if in coming out of a curve the wheels move back again into their normal position of themselves, the torsion element itself will hardly be twisted, so that the twisting torque is very small and the coupling of the motor will be released. Furthermore, the motor coupling will also be released as soon as the wheels have taken a certain position dependent upon the manual steering movement, if then also the twisting torque of the torsion element falls below a certain value or becomes zero. If on account of some defect, perhaps in the control system for the motor, the motor is caused to keep on running, its torque will not be transmitted to the driven steering shaft.

The torsion element is preferably constituted in the form of a torsion bar, in which case the manual drive shaft, the driven steering shaft and the torsion bar can be made in one piece, the torsion bar being constituted as a connecting shaft portion of reduced cross-sectional area.

It should be mentioned that helical spring couplings of various kinds are known, but have not heretofore been utilized in servo steering. Their uses in automotive equipment have rather been in association with electrically driven windows that permit both manual and motor actuation of the window while at the same time preventing the window from being unauthorizedly opened from the outside. These known helical spring couplings thus permit, from the drive side, both manual and motorized actuation, but block the application of rotary force directly on the driven shaft without going through the coupling.

The invention will be further described by way of example with reference to the accompanying drawings, in which.

Figure 1:
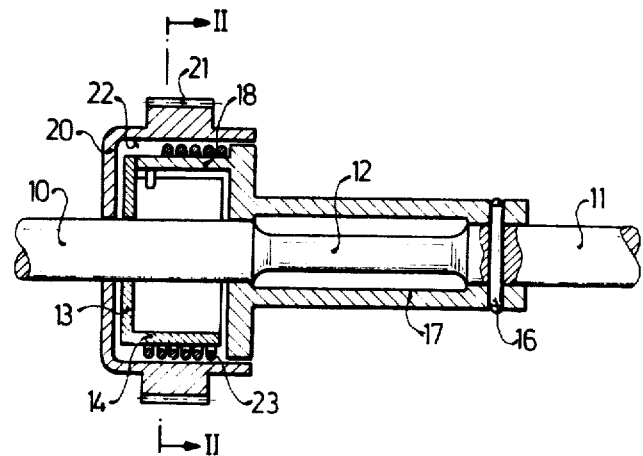
FIG. 1 is a longitudinal cross section of the principal unit of a servo aided steering system according to the invention, containing both a torsion bar coupling and a helical spring coupling for the motor of the system.

FIG. 1 shows a portion of a driving shaft 10 which at its other end is connected to a steering wheel (not shown). The driven shaft 11 is integrally connected to the driving shaft 10 over an intermediate length 12 of reduced cross section that functions as a torsion bar. The driven shaft 11 is shown broken away and it is to be understood that it is connected to a conventional vehicle steering mechanism, not shown in the drawing. A cup-shaped member 13, rigidly affixed to the driving shaft 10 has a part of its side wall 14 cut out, as is shown plainly in FIGS. 2 and 3. This cut-out is designated 15.

A cylindrical structure 17, surrounding the entire length of the torsion bar 12 and provided with a flange facing the cup-shaped member 13, is firmly affixed to the driven shaft 11 by means of a pin 16. A finger 18 is mounted on the flange of the casing 17 at the same radial distance from the shaft 10 as the wall 14 of the cup 13 and at a circumferential position such that the finger 18 protrudes into the cut-out gap 15 in the side wall 14 of the cup member 13 with considerable play on either side.

Surrounding the cup-shaped member 13 and the flange of the casing 17 is the hub 20 of a gear 21 which is arranged so as to be driven by a reversible motor, prreferably an electric motor equipped with permanent magnets. A helical spring 23 operating as a coupling for the motor is located in the bore 22 of the hub 20. The helical spring can have several turns and at its ends has bent-over hooks 24 and 25 that loosely protrude into the cut-out portion 15 of the side wall 14 of the cup member 13 which the spring 23 encircles. In its rest condition the helical spring 23 lies along the wall of the boring 22 with a certain bias, but this bias is so slight that the frictional transmission of force from the hub 20 to the spring 23 is not sufficient to cause the finger 18 to be moved by one of the two hooked ends 24 or 25 of the spring 23.

Figure 2:
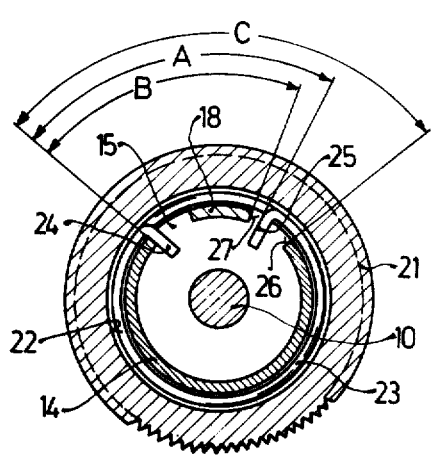
FIG. 2 is a transverse cross section of the coupling unit of FIG. 1 along a line II—II of FIG. 1, for the condition in which the torque transmitted by the torsion bar is zero.

As it may particularly seem in FIG. 2, the distance A measured in the circumferential direction between the hooks 24 and 25 of the helical spring is greater than the distance B between one of the edges 26 of the cut-out 15 and the farther edge 27 of than finger 18. The distance A is, however, smaller 18. The the circumferential dimension C of the cut-out 15 in the cup member 13.

FIG. 2 shows the position of the finger 18 relative to the cut-out 15 in the cup member 13 for the condition when the torque applied to the torsion bar 12 is equal to zero. This position is accordingly the rest position when the vehicle is being driven straight ahead. If in this position, as the result of a failure in the system the electric motor is set into motion, the gear 21 will indeed be driven, but its movement will not be transmitted to the finger 18. On account of the frictional contact between the helical spring 23 and the bore 22 in the hub 20 of the gear 21, the helical spring will be rotated in the direction of rotation just until one of the two hooks, 24 or 25, hits against the edge 26 of the side wall of the cup member 13, as a result of which the helical spring will be drawn together and the coupling will be released.

Figure 3:
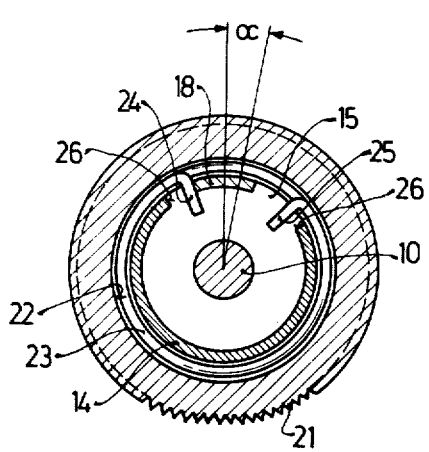
FIG. 3 is a cross section as in FIG. 2, for the condition in which the torque through the torsion bar differs substantially from zero.

If, however, as is shown in FIG. 3, the driving shaft is swung through a certain angle α relative to the driven shaft, as the result of applied torque, the hook 24 hits against the finger 18 before the other hook 25 hits the edge 26 of the cut-out 15. The helical spring is thereby expanded, so that it presses the more strongly against the inner wall of the bore 22 of the hub 20 and the frictional force then finally becomes sufficient to transmit to the finger 18 and thereby to the driven shaft 11 the torque applied by the motor to the gear 21. As soon as this torsion angle α, which depends on the torque in the torsion bar, falls below some definite value, the hook 25 can again engage the edge 26 of the cut-out 15, so that the spring will again be drawn together, reducing the frictional force between the spring and the hub back to so small a value that no torque can be transmitted through the spring. The torque that can be transmitted from the hub 20 to the driven shaft 11 is therefore dependent upon the torsion angle α, which in turn is a function of the torque stressing the torsion bar 12. By the provision of a neutral zone, which in practice is provided by the difference between the distances A and B, the engagement threshold and hence the operational sensitivity can be varied. In the case of a large difference between these spacings servo aiding of the steering effort takes place only when a large torque is applied, whereas with a small difference in these spacings the coupling already engages where a small torque is transmitted. Normally the distance A is chosen to be only slightly greater than the distance B, so that the motor aids manual steering as soon as a torque only slightly differing from zero is applied.

It is important in the described servo aided sterring system, that the coupling of the servo motor through the hub 20 can be effective only when the torque, and hence the torsion angle α, is greater than zero. Only under this condition may the helical spring 23 push with one of its ends against the finger 18 and thereby spread itself and couple the shaft 11 to the hub 20. For a torque equal to zero, which signifies a torsion angle α equal to zero, the helical spring, on the contrary, is always contracted, regardless whether the driving shaft 10 or the hub 20 or the driven shaft 11 is deviated. In this matter the usual free return of the wheels on coming out of a curve is made possible, for the motor can even turn in the direction of rotation opposite to the rotation of the driven steering shaft without thereby limiting or interfering with the steering.

Figure 4:
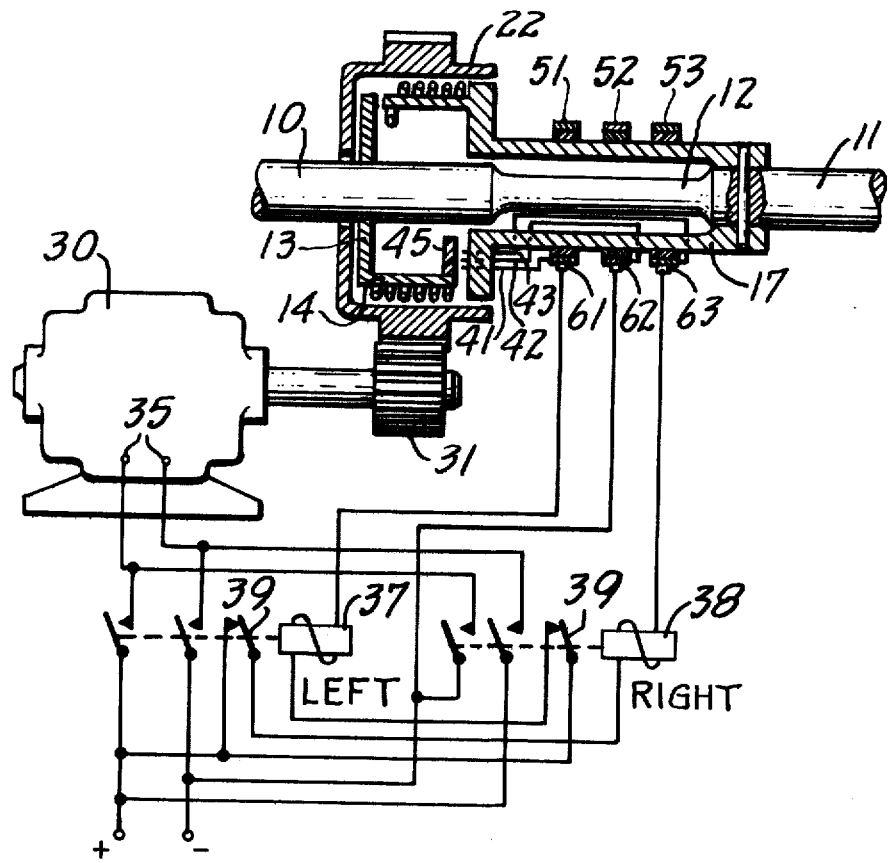
FIG. 4 is a circuit diagram showing the coupling unit of FIG. 1 interconnected with an electric motor in a system according to the invention.

It is advantageous to utilize the torsion element for controlling the switching of the motor into operation in the desired direction, as illustsrated by way of example in FIG. 4. It is not necessary as a rule to control the speed of the servo motor, because the tightening of the helical spring coupling increases continuously with increasing steering torque. Instead of the electronic speed control systems necessary for all known servo steering systems with electric motor drive, in the servo aided system of the present invention the auxiliary torque is mechanically controlled. This concept is also usable with advantage to other slip coupling applications not further described herein.

Figure 5:
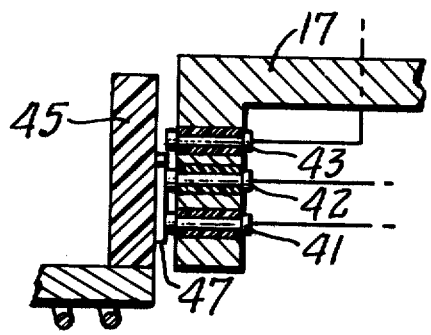
FIG. 5 is a detail of the contacts controlling operation in the motor in the system of FIG. 4.
Figure 6:
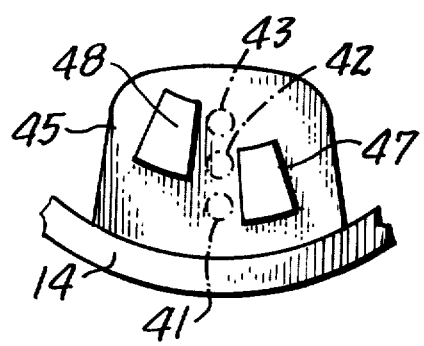
FIG. 6 is an end view, in the axial direction, of certain of the contacts of FIG. 5.

FIG. 4 is a diagram of one simple form of control of the operation of the electric motor by the torque stressing the torsion bar 12. Control contacts 41, 42 and 43 are brought through the flange of the casing 17 through insulated bushing (see FIG. 5) so that they may be pairwise connected together selectively by one of the contact plates 47 and 48 (see FIG. 6) mounted on the insulating bracket 45 which is internally affixed to the wall 14 of the cup member 13. When the torque applied to the torsion bar 12 is zero, none of the contacts 41, 42 and 43 are connected together. If there is torque applied one way or the other, the central contact 42 will be connected to one or the other of the contacts 41 and 43 according to the direction of the torque, as the result of which either the left relay 37 or the right relay 38 will be energized, through two of the insulated slip rings 51, 52 and 53 and two of the brushes 61, 62 and 63. Energization of the left relay 37 turns the motor 30 in the appropriate direction for steering to the left and energization of the right relay 38 turns the motor in the direction for steering to the right. Interlocked contacts 39 are provided to assure that only one of the relays 37 and 38 can be operated at a time, to protect the battery in the case of accidental short circuits in the control circuit. As already mentioned, the motor is preferably a permanent magnet motor so that only the stator or in some cases the rotor, need be energized with current (as through the terminals 35 in FIG. 4), the direction of the current then determining the direction of rotation of the motor. In practice the contacts 41, 42 and 43 are very small in the circumferential dimension — in fact they may be elongated radially. They need not be disposed radially, but of course if they are otherwise disposed the contact plates 47 and 48 must be differently shaped than shown in FIG. 6. What is important is that a slight movement in the bracket 45 relative to the flange of the casing 17 away from the zero torque position in either direction should operate the appropriate directional relay 37 or 38.

The servo aided system above described is distinguished by its particularly simple construction which makes possible further simplification in the control of the motor. This servo aided steering system is outstandingly safe and it assures that in any case of failure of whatever nature in the coupling, in the motor or in the control system of the motor, manual steering is operable without any limitation, interference or additional load. It is furthermore important that even if the torsion element breaks, steering can still be carried out without interference because of the available mechanical engagment between the cup member 13 and the finger 18.

Although the invention has been described with respect to a particular illustrative embodiment, it will be understood that modifications and variations may be made within the inventive concept and that a wide range of applications other than steering of vehicles are possible for the servo aided control system of this invention. The work "steering" as used herein is not to be taken as limiting the scope of the invention and is to be understood as being used in a very broad sense including all sorts of applications of exerting a rotary control to a driven shaft in either direction at various rates and in amounts as may be selected from time to time in operation. Tracking and aiming devices and guidance of the operating head of a machine, as well as the mechanisms more commonly regarded as steering systems, come into consideration.

I claim:

1. Servo aided steering system comprising:
    a manually actuatable driving shaft (10);
    a driven steering shaft (11);
    torsion coupling means (12) for mechanically connecting said driving and driven shafts, while allowing relative displacement therebetween dependent on direction and amount of transmitted torque;
    motor means (30–63) for aiding manual actuation, said motor means being responsive to the presence and direction of the first predetermined minimum amount of torque transmitted through said torsion coupling and being unenergized in the absence of said first predetermined minimum amount of torque, and
    second coupling means (17–27) for coupling said motor means to said driven shaft and for releasing said motor means from said driven shaft when said torque falls below a second predetermined amount of torque, said second coupling means including a rotary element driven by said motor means coaxial with elements respectively mounted on and driving and driven shafts and including also at least one intermediate coupling element and being operable automatically by mechanical engagement and disengagement to couple and to release said motor means as aforesaid, said second predetermined amount of torque being determined by the deformability of at least one of said elements of said second coupling means in response to said relative displacement allowed by said torsion coupling means.

2. Servo aided steering system as defined in claim 1 in which said second coupling means (17–27) comprises a helical spring (23) which in its quiescent condition is biased to lie against the inner wall of a bore (22) in a hub (20) or a rotary member (21) driven by said motor means and, in which further, said helical spring (23) surrounds in spaced relation a cup-shaped member (13) affixed to said driving shaft (10) and provided with a cut-out portion (15) in its peripheral wall (14), and in which, further, said helical spring (23) has bent over ends (24, 25) disposed to grasp into said cut-out (15) of said cup-shaped member (13) and in which, further, a structure (17) carrying a projecting finger (18) is fixedly mounted on said driven shaft (11), said finger (18) being disposed to project into said cut-out (15) and being dimensioned so as to have rotary play within said cut-out and to engage one or the other of said bent over ends (24, 25) of said helical spring (23) or neither of them according to the relative position of said driving and driven shafts.

3. Servo aided steering system as defined in claim 2 in which the quiescent position of said helical spring (23) the spacing (A) between said bent over ends (24, 25) of said helical spring (23) is greater than the spacing (B) between the edge (26) of said cut-out (15) of said cup-shaped member (13) and the farther edge (27) of said finger (18) and that said first mentioned spacing (A) is smaller than the dimension (C) in the circumferential direction of said cut-out (15) in said cup-shaped member.

4. Servo aided steering system as defined in claim 2 in which said finger (18) is affixed to a cylindrical casing (17) which is affixed on said driven shaft (11) for rotation therewith and surrounds said torsion coupling means (12).

5. Servo aided steering system as defined in claim 1 in which said motor means comprises an electric motor (30).

6. Servo aided steering system as defined in claim 5 in which said electric motor (30) is a permanent magnet motor.

7. Servo aided steering system as defined in claim 5 in which the deformation of said torsion coupling (12) operates as a control element for said electric motor.

* * * * *